Aug. 5, 1958     A. D. BRUNDAGE     2,846,074
CENTER-TUBE ASSEMBLY FOR FILTERS
Filed Sept. 13, 1955     2 Sheets-Sheet 1
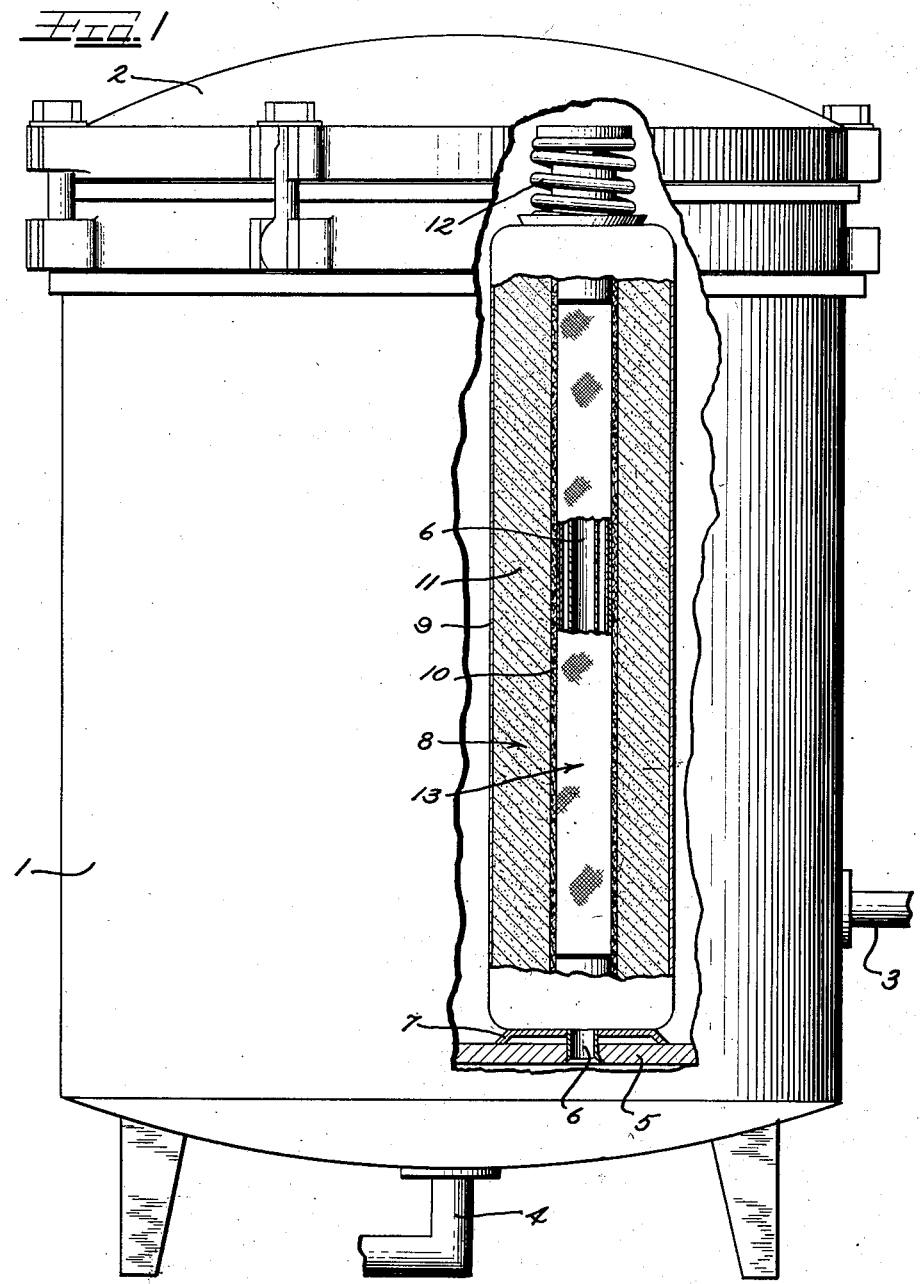
Inventor
ALAN D. BRUNDAGE Aug. 5, 1958
A. D. BRUNDAGE
2,846,074
CENTER-TUBE ASSEMBLY FOR FILTERS
Filed Sept. 13, 1955
2 Sheets-Sheet 2
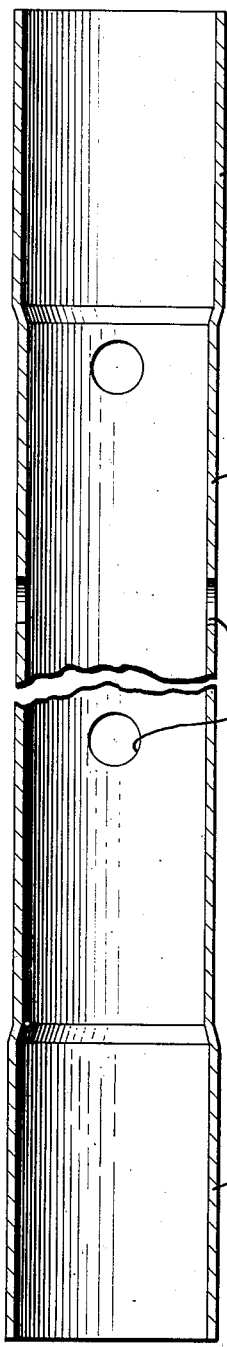
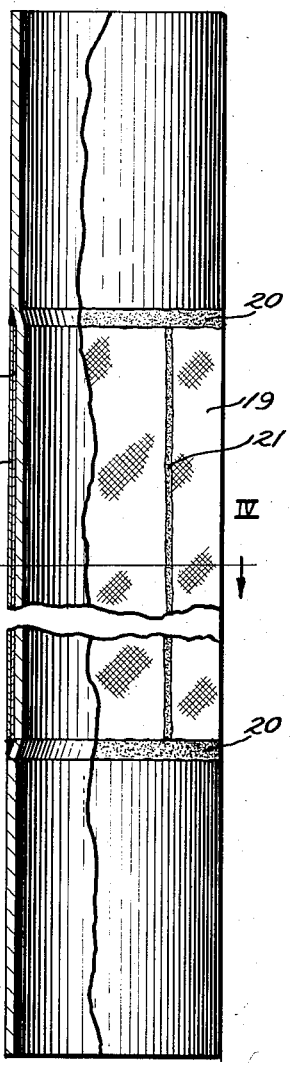
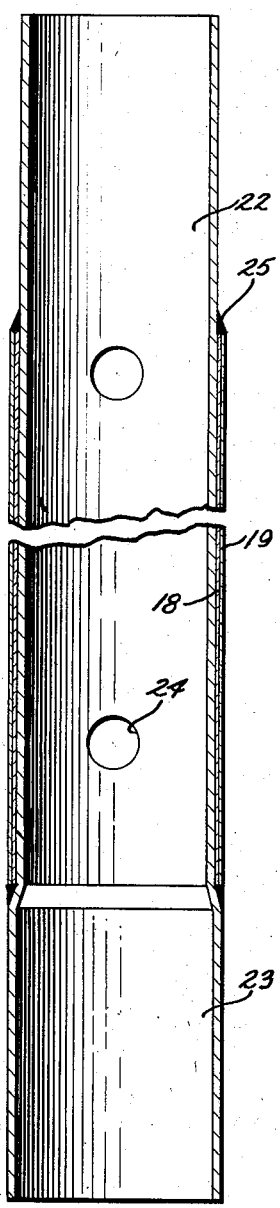
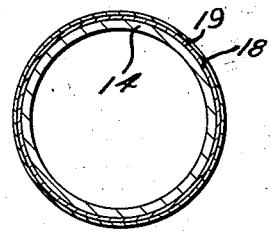
Inventor
ALAN D. BRUNDAGE
Hill, Sherman, Meroni, Gross & Simpson
Attys

United States Patent Office 2,846,074
Patented Aug. 5, 1958

2,846,074

CENTER-TUBE ASSEMBLY FOR FILTERS

Alan D. Brundage, Birmingham, Mich., assignor to Indiana Commercial Filters Corporation, a corporation of Indiana Application September 13, 1955, Serial No. 533,969

2 Claims. (Cl. 210—457)

This invention relates to improvements in a center tube assembly for filters, and more particularly to a center tube assembly for permanent or semi-permanent mounting in an upright position within a filter casing, a filter cartridge being telescoped over the center tube assembly into the casing, although the invention may have other uses and purposes as will be apparent to one skilled in the art.

In the past, many and various types of upright center tubes have been employed in filter casings, wherein filter cartridges having a central opening therethrough are telescoped into the casing over the center tube, the center tube being apertured to permit filtrate to pass thereinto after passing through the filter cartridge. These formerly known types of center tube assemblies have proven objectionable and unsatisfactory in many instances, particularly when utilized with what may be termed a soft filter cartridge, or a cartridge not having a rigid element defining the opening through the center of the cartridge. During operation when liquid is filtered under pressure by the cartridge, a soft lining of the cartridge tends to become tightly engaged with the center tube, and should the center tube employ screen means, the substance of the cartridge lining tends to embed itself in those screen means. Now, if the center tube is shouldered where the screen means are attached thereto, the cartridge interlocks underneath such a shoulder, and it is extremely difficult to remove the cartridge from the filter casing. This is particularly true where a cartridge filled with an earth filtering medium, such as fuller's earth for example, and having a fabric liner such as a relatively heavy piece of felt or the like, is disposed in the casing over the center tube. Even with a relatively rigid lining element defining the opening through the cartridge, difficulty was sometimes experienced in removing the cartridge from a center tube having shoulders thereon owing to collapse of the cartridge liner due to pressure sufficient to force the liquid to be filtered through the cartridge, especially after relatively long usage. While some attempts have been made to cure this difficulty in the past, those attempts have not resulted in sufficient economy of manufacture, or in other words in a center tube assembly embodying a minimum number of parts and which cannot only be manufactured but assembled in a highly economical manner.

With the foregoing in mind, it is an important object of the instant invention to provide a center tube assembly for a filter casing, which assembly may be used with a rigid or soft filter cartridge, and which is so constructed as to afford little if any resistance to removal and replacement of a cartridge.

Another feature of the invention is to provide a center tube assembly embodying screen means covering openings in the tube, with the assembly so constructed as to be substantially of constant diameter throughout its length.

A further object of the invention resides in the provision of a center tube assembly embodying a tubular element having apertures in an intermediate portion thereof, with screen means covering those apertures, and with the tube so constructed that the entire lower portion of the assembly is of substantially constant diameter, including the screen means and the part of the tubular element therebelow.

It is also a feature of this invention to provide a fabricated center tube assembly, including a tubular element having apertures in an intermediate portion thereof, with screen means covering those apertures, the structure being such as to be economically manufactured and of substantially constant diameter, at least from the top of the screen means to the very bottom of the assembly.

It is also an object of this invention to provide a center tube assembly for a filter casing, which assembly includes a one-piece tubular element having at least the lower end portion expanded to greater diameter than the portion thereabove, there being openings in the one-piece tube above the expanded lower portion covered by screen means so sized as to bring the part of the tube covered thereby to substantially a diameter equal to that of the expanded lower portion.

Still another object of the invention resides in the provision of a center tube assembly for filter casings, which assembly comprises a one-piece metallic tube having an intermediate portion of lesser diameter than the end portions, there being apertures in the intermediate portion covered by screen means which after application results in a tubular assembly of substantially constant diameter throughout.

While some of the more salient features, characteristics and advantages of the instant invention have been above pointed out, others will become apparent from the following disclosures, taken in conjunction with the accompanying drawings, in which—

Figure 1 is a side elevational view, with parts broken away and parts shown in section, of a filtering device incorporating a center tube assembly embodying principles of the instant invention, showing the same in operative position;

Figure 2 is an enlarged central vertical sectional view of a portion of the center tube assembly;

Figure 3 is an enlarged part elevational and part central vertical sectional view of the complete center tube assembly;

Figure 4 is a plan sectional view taken substantially as indicated by the line IV—IV of Fig. 3, looking in the direction of the arrows; and Figure 5 is a central vertical sectional view through a center tube assembly of somewhat different construction, but also embodying principles of the instant invention.

As shown on the drawings:

The illustrated embodiment of the instant invention is shown associated with a filtering device as disclosed in Fig. 1, comprising a casing 1 having a cover 2 thereover, with an inlet opening 3 through which liquid to be filtered may enter, this opening 3 communicating with the inside of the casing 1 only. An outlet opening or pipe 4 is provided in the bottom of the casing and this communicates with that portion of the casing below a transverse partition plate 5 which divides the upper portion of the casing from the lower. Mounted in the partition plate 5 is a standpipe 6 which may have apertures in the side wall thereof, or be open at the top end only. Filtrate passes downwardly through the standpipe 6 to the compartment below the plate 5 whereupon it exits through the pipe 4. A flanged platform 7 is provided around the standpipe 6 upon which a filter cartridge 8 may rest. In the illustrated instance this filter cartridge 8 comprises a bag 9 of any suitable fabric, such as canvas for example, with a central opening through the bag defined by a relatively heavy layer of fabric 10 which may be in the form of a felt tube. The tube and the bag 9 comprise an enclosure for a filtering medium 11 which, in the illustrated instance, is a granular medium such as fuller's earth. A suitable flanged compression assembly 12 is provided at the top of the cartridge in order to prevent bypassing of liquid to be filtered.

Around the standpipe is a center tube assembly generally indicated by numeral 13 in Fig. 1, and when the cartridge is placed in position it is telescoped over this center tube assembly. As seen in Fig. 1, the center tube assembly is spaced slightly away from the standpipe 6 to provide a passage for filtrate therebetween. The center tube assembly is permanently or semi-permanently mounted in the casing, and in either event is fixed in position so that the cartridge may be removed and replaced without disturbing the center tube assembly which is held against the flange portion 7 or a gasket disposed thereon, not seen in the drawings.

In the illustrated embodiment of the invention, the cartridge 8 is of the soft type, in that the tube 10 defining the central passage therethrough is not of a rigid character. Therefore, the center tube assembly must be such that the cartridge may be easily slipped into position over the center tube assembly, and easily withdrawn from the casing 1 after it has collected a predetermined amount of contaminants. Obviously, since the liquid to be filtered is under pressure, the cartridge is more difficult of removal than is the insertion of a new cartridge.

It will be understood from the showing in Fig. 1 that the illustrated filtering device is one including a number of cartridges therein, only one of which is illustrated in the drawings.

Now with reference to Figs. 2 to 4 inclusive, it will be seen that the center tube assembly, generally indicated by numeral 13 in Fig. 1, embodies a one-piece tube which is preferably of metal. As seen best in Fig. 2, this tube comprises an intermediate portion 14 which is of less diameter than the expanded upper and lower end portions 15 and 16, respectively. It will be noted, however, that the tube is of substantially uniform wall thickness throughout both in the intermediate portion and in the expanded end portions. This is the preferable construction, and is accomplished by shortening the original length of the tube during the expanding of the end portions 15 and 16.

As seen in Fig. 2, the intermediate portion 14 of the tube is provided with spaced apertures or openings 17, but the expanded end portions 15 and 16 are preferably devoid of any such openings.

Now, with reference to Figs. 3 and 4, it will be seen that the intermediate portion 14 of the tube is covered by screen means embodying an inner screen 18 and an outer screen 19. The inner screen is preferably a relatively coarse metallic screen such as is termed brush wire in the trade, and this screen is preferably tack welded at various points to the intermediate portion 14 of the tube, the tube, of course, being preferably metallic. The outer screen 19 is preferably of such fine character as to preclude migration of the granular particles in the filter cartridge, and to this end this screen is preferably what is termed in the trade a "Dutch weave" screen having extremely fine passages therethrough of such a size as to preclude passage of the granules of fuller's earth or equivalent substance. The brush wire screen 18 inside the Dutch weave screen provides, in effect, a vertical passageway along the intermediate portion of the tube so that filtrate will flow substantially equally through the apertures 17.

As seen best in Fig. 3, the Dutch weave outer screen 19 is preferably brazed or equivalently secured to the tube at the end portions as indicated at 20—20, the brazing being such as to provide an inclined area along the regions of expansion of the tube, and the side edge portions of this screen may be brought together in abutment and brazed longitudinally as indicated at 21.

Now it is to be especially noted that after the application of the screen means over the intermediate portion of the tube, the entire center tube assembly is of substantially constant diameter throughout, the screen means being preferably of sufficient size to bring the intermediate portion of the tube to the same diameter as the expanded end portions 15 and 16.

Heretofore, where a center tube was not provided of substantially constant diameter throughout, the soft liner 10 of the filter cartridge would become compressed against the center tube assembly below a shoulder formed by the screen means, and it was extremely difficult to withdraw the cartridge from over the center tube assembly when it was time to replace the cartridge. Even with screen means around the cartridge, the soft liner of the cartridge becomes slightly embedded within the screen means, so that a slight twisting action of the cartridge to release such embedment is usually required first, but with the present invention the cartridge may readily be slipped off the center tube after such slight twisting operation since there is nothing in the center tube assembly beneath which any portion of the cartridge may latch.

It will further be noted that since the center tube assembly comprises merely a one-piece tube with expanded end portions, and screen means disposed around the intermediate portion of the tube, the structure is extremely economical to manufacture. Obviously, it is long lived and highly durable with substantially a minimum possibility of damage ever accruing to the center tube assembly during the life of the entire filtering device.

Since the filter cartridge is not wet, and packed with contaminants, when placed in position over the center tube assembly, the cartridge will slip into position relatively easy, even though there may be a slight shoulder at the top of the center tube assembly. The important desideratum is the elimination of any such shoulder near the bottom of the assembly under which the fabric liner of the cartridge may latch after the granular filter medium settles, the cartridge becomes wet, and full of contaminants. To this end, it is not always essential to provide uniform diameter in the upper portion of the center tube assembly, and in Fig. 5 I have illustrated a slightly different form of center tube assembly wherein a tube 22 is provided with an expanded lower end 23, this tube being of uniform diameter above the expanded lower end. Suitable apertures 24 are provided in the wall of the tube above the expanded lower end, and preferably an equal distance below the upper end.

That portion of the tube having the apertures is covered by screen means of the same character as above described. The brazing or equivalent securement of these screen means adjacent the region of expansion between the upper part of the tube and the lower end 23 becomes flush with the lower expanded portion of the tube, so that the tube is of constant diameter from the very lower end thereof to the top of the screen means. The screen means may be brazed to the tube at the top in the manner above described, and preferably this brazing is done so as to acquire a sloping shoulder as indicated at 25, which will interfere as little as possible with the dropping of the cartridge into position in the casing over the center tube assembly. Since this sloping shoulder 25 extends inwardly from the movement of the cartridge in withdrawing it from the casing, it will provide no interference whatever to the removal of the cartridge, and the constant diameter junction between the screens and the lower expanded end of the tube 23 provides the same smooth withdrawal action as above explained in connection with the showing in Fig. 3.

The form of center tube assembly shown in Fig. 5 is even more economical in construction than the center tube assembly of Fig. 3, because only one end of the metallic tube need be expanded.

From the foregoing, it will be apparent that I have provided a simple and economical form of center tube assembly for use in filtering devices, which assembly provides no restriction to the insertion and withdrawal of a soft type filter cartridge.

It will be understood that modifications and variations may be effected without departing from the scope of the novel concepts of the present invention.

I claim as my invention:

1. In combination, an open topped filter casing having an inlet and an outlet, a fixed rest in the bottom of said casing around the outlet, a center tube assembly aligned with said outlet and rigidly secured at its lower end to the casing, said assembly comprising an upstanding tube having expanded end portions and an intermediate portion of less diameter provided with at least one aperture in the side wall thereof, fine screen means around said intermediate portion to increase the diameter thereof to that of the end portions, said screen means secured to said tube in a manner to provide a smooth shoulderless joint at the junctions of the end and intermediate portions, a soft filter cartridge comprising a fabric bag filled with a pulverulent filter medium and having a central opening therethrough telescoped over said center tube assembly to seat on said rest, a cover for said casing, and resilient means associated with said cover to force said cartridge against said rest, said cartridge being freely removable from said casing and said center tube assembly when said cover is removed.

2. In combination, an open topped filter casing having an inlet and an outlet, a fixed rest in the bottom of said casing around the outlet, a center tube assembly aligned with said outlet and rigidly secured at its lower end to the casing, said assembly comprising an upstanding tube having at least the lower end portion expanded with a longer portion of less diameter extending thereabove and at least one aperture in the side wall of said longer portion, fine screen means covering the apertured portion of said tube to increase the diameter to that of the lower end of said tube and secured to the tube in a manner to provide a smooth shoulderless joint at the junction between the expanded end and longer portions, a soft filter cartridge comprising a fabric bag filled with a pulverulent filter medium and having a central opening therethrough telescoped over said center tube assembly to seat on said rest, a cover for said casing, and resilient means associated with said cover to force said cartridge against said rest, said cartridge being freely removable from said casing and said center tube assembly when said cover is removed.

References Cited in the file of this patent
UNITED STATES PATENTS

| | | |
|---|---|---|
| 2,487,146 | Lasky | Nov. 8, 1949 |
| 2,654,483 | Ahlijian | Oct. 6, 1953 |